US012548890B2

(12) United States Patent
Plokker et al.

(10) Patent No.: US 12,548,890 B2
(45) Date of Patent: Feb. 10, 2026

(54) AIRCRAFT ANTENNA

(71) Applicant: Airbus Operations GmbH, Hamburg (DE)

(72) Inventors: Matthijs Plokker, Hamburg (DE); Sebastian Wicher, Hamburg (DE); Michael Karwin, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 99 days.

(21) Appl. No.: 18/391,108

(22) Filed: Dec. 20, 2023

(65) Prior Publication Data

US 2024/0213659 A1 Jun. 27, 2024

(30) Foreign Application Priority Data

Dec. 21, 2022 (EP) .................................... 22215446

(51) Int. Cl.
*H01Q 1/28* (2006.01)
*H01Q 1/42* (2006.01)

(52) U.S. Cl.
CPC ............... *H01Q 1/282* (2013.01); *H01Q 1/42* (2013.01)

(58) Field of Classification Search
CPC .......... H01Q 1/28; H01Q 1/282; H01Q 1/286; H01Q 1/42; H01Q 1/421; H01Q 1/422; H01Q 1/424; H01Q 1/425; H01Q 1/427; H01Q 1/428
See application file for complete search history.

(56) References Cited

U.S. PATENT DOCUMENTS

| | | | | |
|---|---|---|---|---|
| 10,931,003 | B2 | 2/2021 | Berioli et al. | |
| 2008/0309569 | A1 | 12/2008 | Berejik | |
| 2015/0130671 | A1* | 5/2015 | Cordone | H01Q 5/30 343/705 |
| 2016/0172748 | A1 | 6/2016 | Keen et al. | |
| 2017/0054208 | A1 | 2/2017 | Pietila et al. | |
| 2018/0331424 | A1* | 11/2018 | Sclafani | H01Q 1/42 |
| 2019/0305408 | A1* | 10/2019 | Chao | H01Q 1/286 |

OTHER PUBLICATIONS

European Search Report for EP22215446.0 mailed Jun. 15, 2023, 9 pages.

* cited by examiner

*Primary Examiner* — Daniel Munoz
(74) *Attorney, Agent, or Firm* — Nixon & Vanderhye P.C.

(57) ABSTRACT

An aircraft antenna (101) including a radome (102) wherein the radome (102) has a main body (105) shaped to enclose one or more antennae (107) when the antenna (101) is attached to a fuselage skin portion (103), wherein the main body (105) includes a front surface portion (203), a rear surface portion (401), adjacent side surface portions (205, 207), and an upper surface portion (209) that form a smooth outer aerodynamic surface (211) of the antenna (101), and wherein the upper surface (209) is substantially planar in shape along a length of 60% to 80% of a length (L) of the of the radome (102).

20 Claims, 5 Drawing Sheets

AIRCRAFT ANTENNA

RELATED APPLICATION

This application incorporates by reference and claims priority to European patent application EP 22215446.0, filed Dec. 21, 2022.

TECHNICAL FIELD

The present invention relates to aircraft antenna.

BACKGROUND

An aircraft antenna is a system of aircraft components assembled and operated so as to provide connectivity between an aircraft and a communication network, e.g. a satellite network.

A typical aircraft antenna comprises antenna system components required for the correct functionality of the antenna, and a plurality of structural components that provide the mechanical interface between the antenna and the aircraft as well as provide an aerodynamic and environmental enclosure for the antenna system components. The structural components are designed to withstand all structural loads expected during flight.

Aircraft antennas can be mounted to an external aircraft fuselage portion via a set of lug and clevis fittings and an adapter plate otherwise known as a mounting plate. The fittings typically require doubler plates inside the fuselage to strengthen the fuselage skin area where they are attached and are typically mounted and configured according to ARINC 791 or 792 standards to the adapter plate. The adapter plate supports the antenna system components such as one or more beam forming antenna or gimbal antenna. A radome is attachable to the adapter plate so as to form an enclosure when attached to cover the antenna system components and protect them from the external environment and agents, such as, dirt, hail stones, water, de-icing fluid and wildlife. The radome is also configured to form a smooth outer surface of the antenna that ensures that the aerodynamic drag impact of the aircraft antenna and disturbances to the local airflow are kept to a minimum so as not to change considerably the aircraft performance. Sometimes an aerodynamic skirt may be fitted between the adapter and the fuselage skin that also surrounds the adapter plate so as to form an aerodynamic surface extension of the radome (and hence the outer aerodynamic surface of the antenna) between the radome and the aircraft's fuselage. In terms of aerodynamic shape, the skirt and radome may be simply considered as a single outer surface, and referred to as a radome surface or fairing surface.

In addition to the abovementioned design goals, the design and shape of prior art radomes is adapted to optimize the material weight of the radome itself. This means antenna radomes of the prior art tend to be highly curved structural components that project radially outwards from an aircraft fuselage when installed. Their optimization in terms of weight and enclosed volume means they are still less optimized for aerodynamic impact such as loading, drag and aero acoustics.

Such curved and highly aerodynamically loaded antenna radome designs are also complex to manufacture and due to higher aerodynamic loading, the fuselage of an aircraft often requires additional and complex structural reinforcement before attachment of the prior art antenna. Such designs may add cost to certifying and developing modification kits for the prior art antenna designs per aircraft type The costs may also be increased for operator of the aircraft, both in terms of installation and repair of the antenna the system and operation of the aircraft with the system.

SUMMARY

The invention may be used to improve the aerodynamic characteristics and usability of aircraft antenna radomes known in the art, as well as their cost to manufacture, implementation and operation.

An aircraft antenna is disclosed that is attachable to an outer fuselage skin portion of an aircraft. The antenna comprises a radome further comprising a main body shaped to enclose an antenna system when the antenna is attached the fuselage skin portion or to an adapter plate. The main body comprises a front surface portion, a rear surface portion, adjacent side surface portions and an upper surface portion that are blended into one another circumferentially such that the main body comprises a symmetric, uniform and aerodynamically smooth outer surface, and the upper surface is substantially flat and planar in shape between 60% to 80% of the length L of the radome.

The presence of a substantially planar upper surface of the radome results in an antenna design that has a significantly improved aerodynamic performance when compared to the state of the art, even in cases where the antenna is greater in size than state of the art antennae Improved overall drag performance of the provided design is based on a significant reduction of both skin friction drag and form drag (expressed in terms of aircraft drag count), which reduces overall drag of the antenna by approximately 40% compared to the prior art, but as much as approximately 65%, while ensuring a favourable enclosed antenna volume distribution that is suitable for the enclosure of antenna system components. Laminarity of the flow as it transitions past the radome is also increased considerably. Such aerodynamic improvements lead to overall lower aerodynamic loading and lower drag. Lower drag and loading requires less material, or less stiff and strong materials in the antenna design, therefore lowering weight and cost and therefore also contributing to lower fuel burn for the aircraft, lower aero-acoustic signature of the radome and improved quality of the airflow impinging of aircraft surfaces aft of the radome such as the lower dorsal region of the vertical tail plane.

A further significant advantage of the reduced drag design is that the aerodynamic loads generated by the radome and transmitted to the fuselage via the connection assembly are significantly reduced compared to the prior art by approximately 40% but as much as approximately 50%. While the antenna may be larger, and depending on construction, heavier, it ultimately has a lower aerodynamic loading, which enables the user to design or use existing smaller lighter weight fuselage reinforcements and use a much more simplified attachment concept overall, and potentially a lighter antenna system weight overall. It may also enable existing antenna to be swapped out without the need for redesigning, reinforcing or recertifying the existing attachment concept for a larger more streamlined antenna, because in spite of the size, the new design of the present invention imparts lowers loads on the existing attachment concept. This is particularly advantageous when retrofitting the antenna to existing aircraft types that previously had no antenna, or when swapping out an existing antenna that uses for example ARINC791 or ARINC792 standard lugs, because significant modification of the aircraft structure or attachment structure for reinforcement and a complex installation are avoided, making the total cost of retrofit significantly cheaper for aircraft operator.

A further advantage of the claimed design with a flat upper surface to the extent specified enables the enclosed volume of the radome to be maximised while ensuring optimum aerodynamic loading and drag. This may be improved even further when combining the antenna radome with relatively flat forms of antenna system component, such as a flat electronically steered antenna (ESA). Furthermore, it may also enable the attachment principle to be standardised. This results in a radome and antenna system that can be used across a multiple aircraft platforms without the need for non-standard parts for each aircraft type. This is attractive both technically and commercially in terms of certification effort and development costs where an antenna may be designed within a loads and design impact envelope that encompasses multiple aircraft type including single aisle and/or wide body aircraft. As mentioned, due to the low aerodynamic loading of the radome, some of the load bearing capacity of the ARINC 791 or 792 fittings may be used to attach the antenna directly to the fuselage, therefore foregoing the need for an adapter plate, and use of the remaining unused fittings to attach the radome to the fuselage. This not only reduces the weight of the overall antenna, but also either increases the usable enclosure volume for the antenna system components, and/or enables reduction of the height of the antenna radome, resulting in even further reduce drag and loading. This may be improved even further when combining the antenna radome with relatively flat forms of antenna system component, such as a flat electronically steered antenna (ESA). Use of a flat ESA in combination with the radome shape of the present invention is particularly advantageous as it enables lowering the height of the antenna even further, and therefore to enhance further the advantages so far described.

A front surface portion and a rear surface portion of the radome may each form a slope angle (M1, M2, respectively) relative to the fuselage skin portion when the antenna is attached to the fuselage and the magnitude of the slope angle M1 of the first surface portion may greater than the magnitude of the slope angle M2 of the second surface portion. The relative difference between the slope angles allows a different distribution of the enclosed volume of the radome, such that an enclosed antenna can be positioned closer to the front of the radome than the back of the radome. This is advantageous because many aircraft have an aft portion of the fuselage that increases in curvature the further one moves aft along the fuselage outer surface. The performance of some antennae benefit from being aligned as much as possible horizontally, therefore the option to locate them in flatter portions of the fuselage helps achieve this alignment without increasing the overall height of the radome.

The magnitude of the first surface portion's slope angle M1 may be between 30 and 40 degrees. Such a range allows the pressure (form) drag to be kept to a minimum while also enabling the favourable distribution of the enclosed volume of the radome, as previously mentioned.

The magnitude of the second surface portion's slope angle M2 may be between 10 and 20 degrees. Such a range enables laminar flow to be maintained over the antenna and ensures no local reflow at the rear surface portion of the radome.

The upper surface may be substantially planar in shape between 70% and 75% of the length L of the radome. Such a sub range provides an optimum balance for overall drag reduction of the radome versus the enclosed usable volume available in the X direction for the antenna installation.

The upper surface may be substantially planar in shape up to 80% of a width W of the radome along 60% to 80% of the length L of the radome, or along 70 to 75% of the length L of the radome (102), where such a sub range may provide an optimum balance for overall drag reduction of the radome versus the enclosed usable volume available in the Y direction for the antenna installation.

The height H of the substantially planar upper surface to the fuselage skin may be approximately 3% of the overall length L of the radome. Such a low profile design may provide an optimum configuration for overall drag reduction of the radome while providing a suitable enclosed usable volume available for the antenna installation, an in particular for a flat electronically steered antenna.

The substantially planar upper surface may be substantially aligned with the freestream direction S, in other words the planar surface is inclined such that it is orientated in the freestream direction S. Such a design is advantageous in that it reduces form drag of the radome to the highest extent possible over its length.

The width W of the main body in the aft-most 30% of the radome may be greater than the width W of the main body in the foremost 30% of the radome, in other words; from a planform view the radome is tapered more at the front that at the aft portion of the radome. Again, such a design is advantageous in that it reduces form drag of the radome to the highest extent possible over its length and also promotes laminarity of the airflow being maintained over the entire length of the radome.

The structure of the antenna radome may be configured to be attached to an aircraft fuselage by receiving or providing one or more ARINC 791 or ARINC 792 type lugs. Such a configuration may make the radome compatible with attachment configurations used by existing antenna radomes, therefore reducing the overall cost of implementing the radome as a retrofit or replacement. The antenna may comprise a radome that is attachable to an adapter plate rather than the fuselage.

An aircraft fuselage is also provided with an aircraft antenna radome as previously described as well as an aircraft comprising said aircraft antenna radome.

Further advantages of the invention will now become apparent from the detailed description with appropriate reference to the accompanying drawings.

BRIEF DESCRIPTION OF DRAWINGS

Embodiments are presented herein are described below with reference to the following drawings, in which.

DETAILED DESCRIPTION

With reference to all figures, in a typical coordinate convention appreciated by the skilled person, the X, Y and Z axes correspond to a set of orthogonal aircraft axes, whereby X is the longitudinal aircraft axis, Y corresponds to the lateral aircraft axis oriented in a spanwise direction of the wing of the aircraft, and the direction Z corresponds to the vertical axis, these three directions being orthogonal to each other, and create a set of three orthogonal planes with respect to each other. It should also be noted that typically the freestream direction S is approximately co-linear with the airplane X axis when the aircraft is in steady and level flight.

Figure 1:
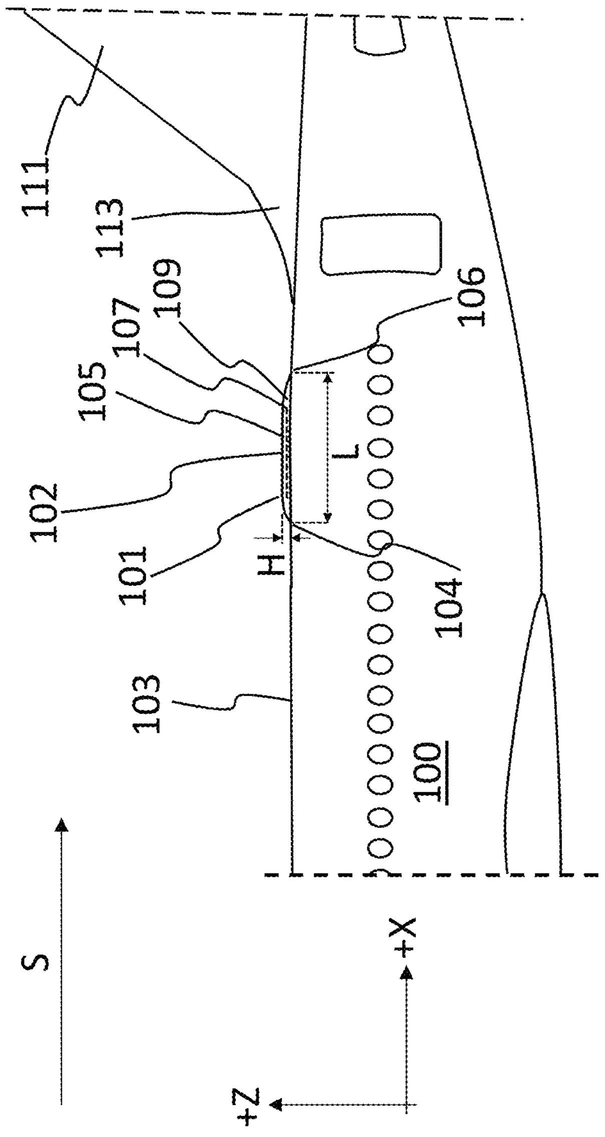
FIG. 1 is a combined side view and section view of an aircraft antenna (101) comprising a radome (102) and antennae (107) attached to an aircraft fuselage (103) according to the present invention. The section is through the radome in plane XZ.
Figure 2:
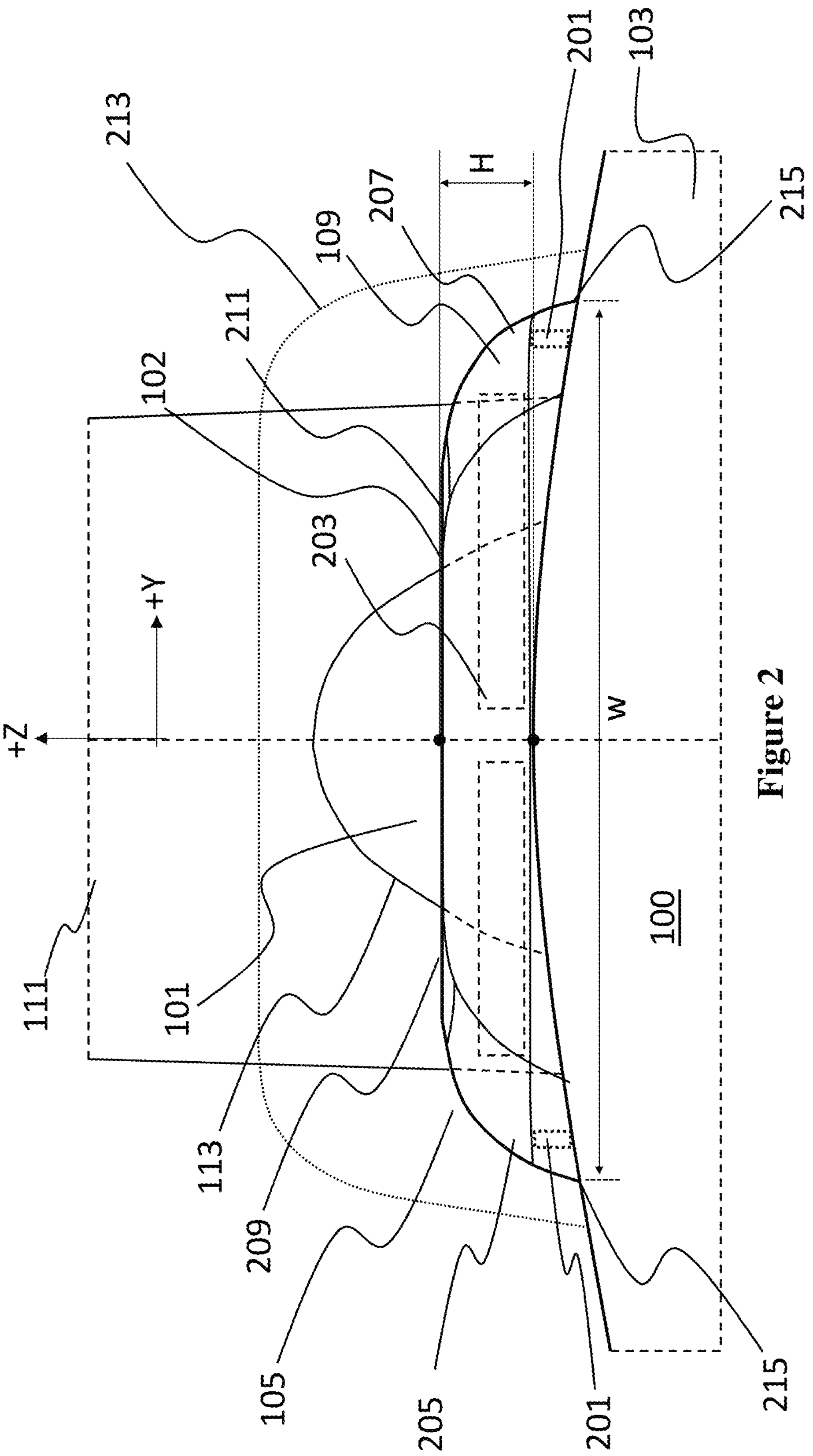
FIG. 2 is a combined front and section view of the fuselage (103), antenna (101) with the radome (102) of FIG. 1. The section is through the fuselage in plane YZ.

FIGS. 1 and 2 show an aircraft antenna (101) comprising a radome (102) attached to an upper outer fuselage skin portion (103) of an aircraft (100). The radome (102) comprises an oblong main body (105) that is substantially symmetric through the XZ plane. The main body (105) of the radome (102) extends outward away from the fuselage skin (103) by a height H measured in the Z direction to form an enclosed volume (109) around flat electronically steered antennae (107) arranged in tandem and proceeding in a series of three rows aft-wards within the radome enclosure (109). Other configurations of one or more antennae (107) are also possible.

The main body (105) of the radome (102) is formed from monolithic glass fibre reinforced composite material, however the skilled person will appreciate that any other suitable material such as carbon or quartz reinforced polymer may be used. The material forming the main body (105) may be substantially transparent to radio-frequency (RF) radiation.

Integral stiffeners, ribs or other common components may be used in locations if needed to stiffen the radome (102). The main body (105) comprises a front surface portion (203), a rear surface portion (401), adjacent side surface portions (205, 207) and an upper surface portion (209) that are blended into one another circumferentially such that the main body (105) comprises a symmetric, curved and aerodynamically smooth outer surface (211). The main body (105) has an aerodynamically smooth outer surface substantially free from discontinuations, steps and gaps that may otherwise degrade a laminar boundary layer.

The main body (105) has a total length L measured in the X direction measured on the X-Z axis of symmetry between a leading edge (104) and a trailing edge (106) of the radome (102). The main body (105) of the radome (102) is of width W that is measured in the Y direction, and that may be measured at any point along the length L of the radome (101).

The radome (102) of the present embodiment is attached at an upper outer portion of the fuselage skin (103) upstream from a dorsal fairing (113), which forms a root portion of the leading edge of the vertical tail plane (111). FIG. 2 shows the antenna (101) installation on the aircraft (100). The antenna (101) is upstream of the dorsal fairing (113) and partly obscures it. For reference, an outline (213) of a prior art antenna is provided to compare overall prior art frontal shape and height to the frontal shape and height of the antenna falling within scope of the present invention.

The antennae (107) and the main body (105) are secured to the fuselage (103) via a set of 7× ARINC 791 standard fittings (201) formed of 7× lugs fittings (201) attached to external doublers (not shown) secured to the fuselage skin (103) and bolted to 7× corresponding clevis fittings fitted to the main body (105) and antennae (107). The fittings (201) provide a means of removably attaching the radome (102) to the fuselage portion (103) (meaning the antenna radome is detachable, attachable).

The antenna (101) may also comprise an adapter plate used as a platform to attach the radome (102) and antennae (107) to the fuselage skin (103) using an ARINC 791 or 792 standard set of attachment fittings. In such a case, an aerodynamic skirt component (not shown) may also be used, but it should be appreciated that the outer surface (211) of the antenna (101) would comprise both the radome (102) and the skirt (not shown) and would be considered together to form the uniform outer surface (211) of the antenna (101).

Figure 3:
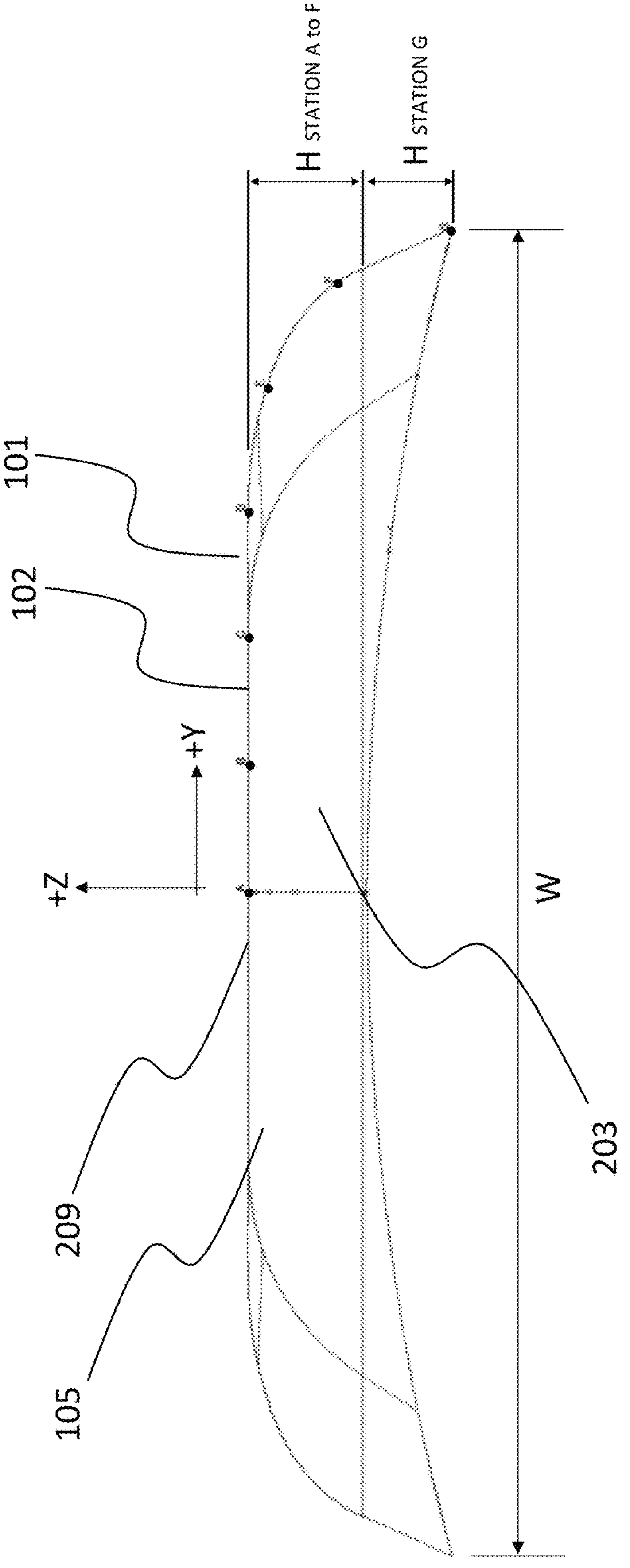
FIG. 3 is a front view of the antenna (101) and radome (102) of FIGS. 1 and 2, showing height H values in plane YZ of the radome (102). The set of sequential geometric points (A through to G) are taken in the YZ plane at peripheral point G of FIG. 4 on the peripheral edge (215) of the radome (1021). Points A to G of FIG. 3 are to be read in conjunction with Table 1.

With reference to FIG. 3 the height H of the radome (102) is indicated at a number of indicated set of point stations (A to G), each lying on the outer surface (211) of the radome (102) and as measured from the top most point of the fuselage (103) is given by the following table 1, where H is expressed in terms as a percentage of the Total length L of the radome (102) and the corresponding relative position of the station in the Y direction from a plane of symmetry XZ is expressed as a percentage of the total width W of the radome (102).

TABLE 1 read in conjunction with FIG. 3

| STATION REF. | Position in +Y direction (as % of W) | Height H in +Z direction (as % of L) |
|---|---|---|
| A | 50% (on plane XZ) | 3% |
| B | 60% | 3% |
| C | 69% | 3% |
| D | 79% | 3% |
| E | 88% | 3% |
| F | 96% | 1% |
| G | 100% | (−)2% |

As can be seen from Table 1, the height H of the substantially planar upper surface (109) to the fuselage skin (103) is approximately 3% of the overall length L of the radome (102) at the position they are taken. The height is constant across 76% of the width W of the radome at the station also, which is optimised for the type of the antennae (107) enclosed as previously described.

Figure 4:
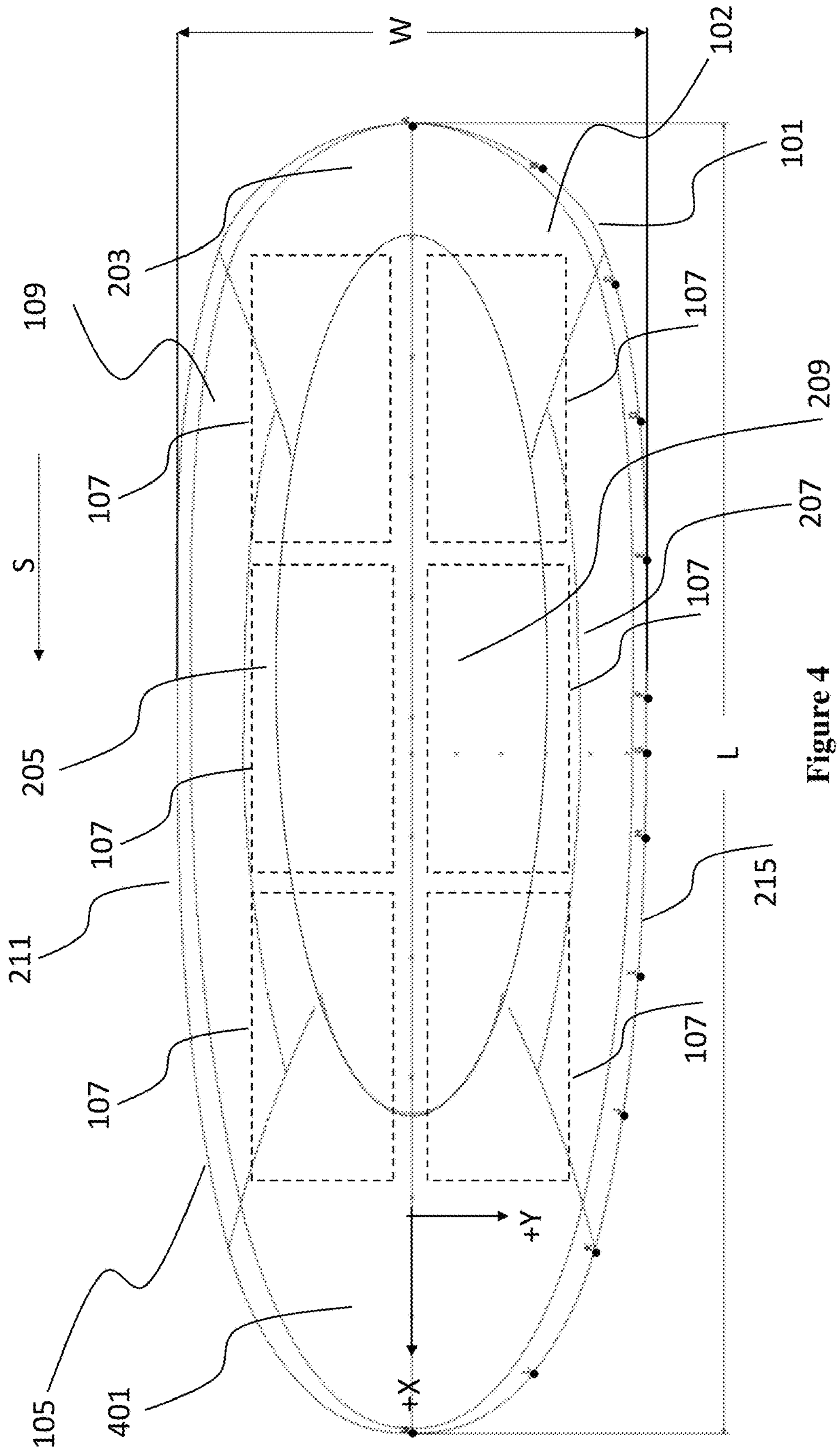
FIG. 4 is a planform view of the radome (101) of FIGS. 1 to 3 projected onto plane XY, and includes a set of sequential geometric points (A through to M) on the peripheral edge (215) of the radome (101) in the positions shown. Points A to M of FIG. 4 are to be read in conjunction with Table 2.

With reference to FIG. 4, the width W of the radome (102) is given at a number of indicated point stations (A to M), each lying on the outer surface (211) of the radome (102) by the following table 2, where W is expressed as a percentage of the total length L of the radome (102) and the corresponding relative position of the station in the X direction from the foremost station is also expressed as a percentage of the total length L of the radome (102).

TABLE 2 read in conjunction with FIG. 4

| STATION REF. | Position in +X direction (as % of L) | Width W in +Y Direction (as % of L) |
|---|---|---|
| A | 0% | 0% |

TABLE 2-continued read in conjunction with FIG. 4

| STATION REF. | Position in +X direction (as % of L) | Width W in +Y Direction (as % of L) |
|---|---|---|
| B | 9% | 20% |
| C | 18% | 31% |
| D | 27% | 35% |
| E | 36% | 36% |
| F | 45% | 36% |
| G | 48% | 36% |
| H | 55% | 36% |
| I | 64% | 35% |
| J | 73% | 32% |
| K | 82% | 28% |
| L | 91% | 18% |
| M | 100% | 0% |

As can be seen from Table 2, the width W of the main body (105) of the radome (102) tapers and in the aft-most 30% of the radome the width W is less than the width W of the main body in the foremost 30% of the radome, in other words; from a planform view the radome is tapered more at the rear portion (401) than the front portion (203) of the radome (102). As can be seen when reading table 1 and 2 in combination, the upper surface (209) is be substantially planar in the Y direction up to 80% i.e. between 1% to 80% of a width W of the radome (102) and along 70% to 75% of the length L of the radome (102), although this width characteristic may extend further between 60 and 80% of the Length L of the radome (102), but performance will be less optimised. Use of such sub ranges provides gradual tapering of the planar surface in the X direction, allowing for a reduction in form drag, and an optimum balance for overall drag reduction of the radome versus the enclosed usable volume available in the X and Y direction for the antenna (107) installation. In terms of aerodynamic performance, this geometry also promotes laminarity of the airflow being maintained over substantially the whole length of the radome (102).

Figure 5:
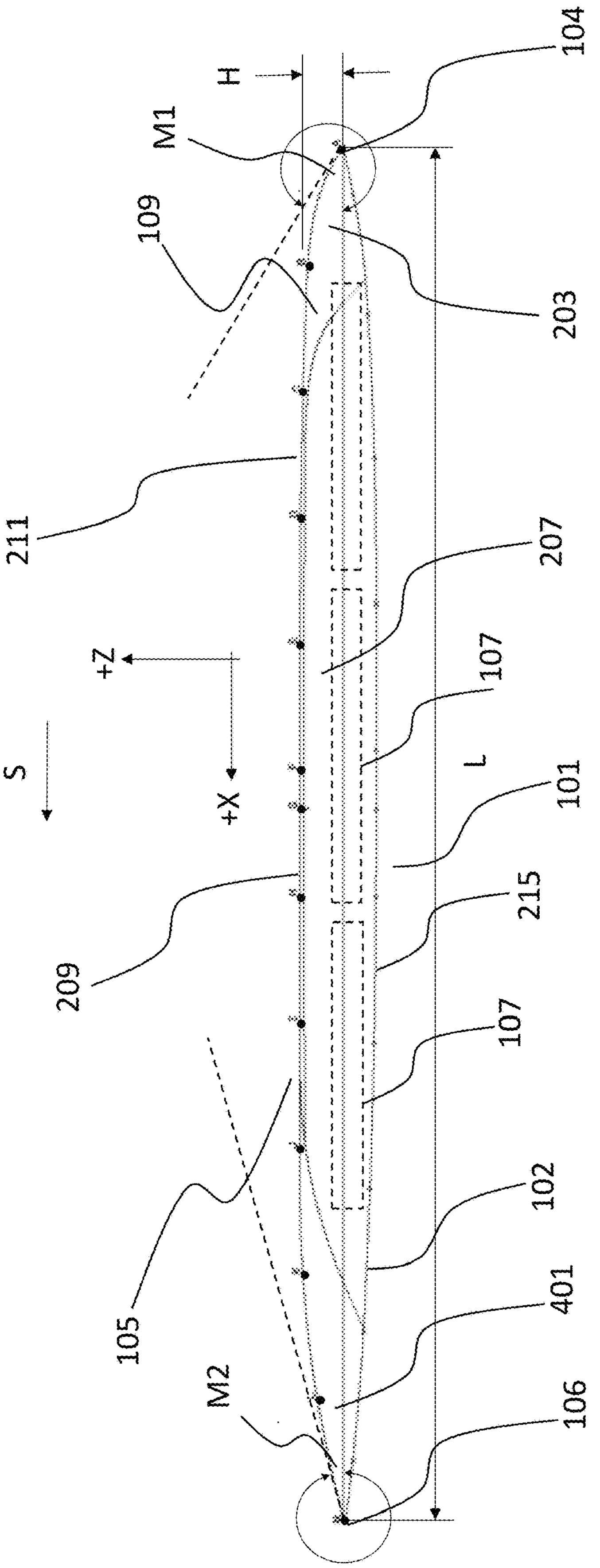
FIG. 5 is a side view of the antenna (101) and radome (102) of FIGS. 1 to 4 projected onto plane XZ, and including a set of sequential geometric points (A through to M) that intersect the XZ plane and the outer surface (211) of the radome (102) at the positions shown. Points A to M of FIG. 5 are to be read in conjunction with Table 3.

With reference to FIG. 5, the height H of the antenna radome (102) when measured from the topmost point of the fuselage (103) to outer surface (211), is provided in the following table 3 for a number of point stations (A to M) as indicated. Each point station lies on the outer surface (211) of the radome (102). H is expressed in terms as a percentage of the Total length L of the radome (102) when measured in the ZX plane. The position of the point station is and the corresponding relative position of the station in the X direction from a plane of symmetry XZ is expressed as a percentage of the total length L of the radome (102).

TABLE 3 read in conjunction with FIG. 5

| STATION REF. | Position in +X direction (as % of L) | height H in +Z direction (as % of L) |
|---|---|---|
| A | 0% | 0% |
| B | 9% | 3% |
| C | 18% | 3% |
| D | 27% | 3% |
| E | 36% | 3% |
| F | 45% | 3% |
| G | 48% | 3% |
| H | 55% | 3% |
| I | 64% | 3% |
| J | 73% | 3% |
| K | 82% | 3% |

TABLE 3-continued read in conjunction with FIG. 5

| STATION REF. | Position in +X direction (as % of L) | height H in +Z direction (as % of L) |
|---|---|---|
| L | 91% | 2% |
| M | 100% | 0% |

As can be understood from FIG. 5 and Table 3, the height of the radome (102) is constant over approximately 74% of the total length L of the radome (101), and the upper surface (209) is co-linear with the freestream direction S (substantially parallel to the X axis).

The front surface portion (203) and a rear surface portion (401) of the radome (102) each form a slope angle (M1, M2, respectively), as shown, relative to the fuselage skin portion when the radome (102) is attached to the fuselage (103). The magnitude of the slope angle M1 is greater than the magnitude of slope angle M2, where M1 is 35 degrees and M2 is 15 degrees.

Where in the foregoing description, integers or elements are mentioned which have known, obvious or foreseeable equivalents; then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment (s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft antenna including a radome, wherein the radome comprises:

a main body shaped to enclose one or more antennae when the aircraft antenna is attached to a fuselage skin portion, wherein the main body comprises a front surface portion, a rear surface portion, adjacent side surface portions, and an upper surface portion that form a smooth outer aerodynamic surface, and wherein the upper surface includes a planar portion that is planar in shape and the planar portion has a length that is in a range of 60% to 80% of a maximum length of the radome.

2. The aircraft antenna of claim 1, wherein the front surface portion forms a first slope angle relative to a first portion of the fuselage skin adjacent the front surface portion and the rear surface portion forms a second slope angle relative to a second portion of the fuselage skin adjacent the rear surface portion, and wherein a magnitude of the first slope angle is greater than a magnitude of second slope angle.

3. The aircraft antenna of claim 2, wherein the magnitude of the first slope angle is in a range of 30 to 40 degrees.

4. The aircraft antenna according to claim 3, wherein the length of the planar portion of the upper surface in a range of 70% to 75% of the maximum length of the radome.

5. The aircraft antenna of claim 2, wherein the magnitude of the second slope angle is in a range of 10 to 20 degrees.

6. The aircraft antenna according to claim 1, whereby the width of the planar portion of the upper surface is in a range of 1% to 80% of a width of the radome.

7. The aircraft antenna according to claim 1, wherein the planar portion of the upper surface is has a height along the length of the planar portion that is approximately 3% of the maximum length of the radome.

8. The aircraft antenna according to claim 1, wherein the planar portion is inclined substantially in a freestream direction.

9. The aircraft antenna according to claim 1, wherein a width of the main body at an aft portion of the main body is less than a width of the main body in a forward portion of the radome.

10. The aircraft antenna according to claim 1, wherein the radome is configured to be attached to the aircraft fuselage by fittings.

11. The aircraft antenna according to claim 1, further comprising an adapter plate wherein the radome is configured to attach to the adapter plate, and the adapter plate is configured to be attached to the aircraft fuselage by fitting.

12. The aircraft antenna according to claim 1, configured to be attached by fittings conforming to an ARINC 791 standard or an ARINC 792 standard.

13. The aircraft antenna according to claim 1, further comprising one or more antennae enclosed by the aircraft antenna radome, wherein the one or more antennae are flat electronically steered antenna.

14. An aircraft fuselage comprising the aircraft antenna according to claim 13.

15. An aircraft comprising the aircraft antenna according to claim 1.

16. An aircraft comprising:

a fuselage having an outer skin surface and a longitudinal axis;

an antenna mounted to the fuselage at the outer skin surface; and a radome including:

a main body covering the antenna, wherein the main body includes a front surface portion, a rear surface portion, and adjacent side surface portions each extending to the outer skin surface and to an upper surface portion, wherein the front surface portion, the rear surface portion the adjacent side portions and the upper surface portion form a smooth outer aerodynamic surface, wherein the upper surface includes a planar portion which is planar along the longitudinal axis and the planar portion has a length along the longitudinal axis in a range of 60% to 80% of the maximum length of the radome.

17. The aircraft according to claim 16, wherein the front surface portion forms a first slope angle relative to a first portion of the fuselage skin which is adjacent and aligned with the front surface along a longitudinal axis of the fuselage, wherein the rear surface portion forms a second slope angle relative to a second portion of the fuselage skin adjacent and aligned with the rear surface portion along the longitudinal axis, and wherein a magnitude of the first slope angle is greater than a magnitude of second slope angle.

18. The aircraft according to claim 17, wherein the magnitude of the first slope angle is in a range of 30 to 40 degrees and the magnitude of the second slope angle is in a range of 10 to 20 degrees.

19. The aircraft according to claim 16, wherein the height of the planar portion is no greater than 3% of the maxim length of the radome.

20. The aircraft according to claim 16, wherein a width of the main body at an aft portion of the main body is less than a width of the main body in a forward portion of the radome.

* * * * *